US008160835B2

(12) United States Patent
Doerken et al.

(10) Patent No.: US 8,160,835 B2
(45) Date of Patent: Apr. 17, 2012

(54) METHOD FOR MEASURING UNIDIRECTIONAL TRANSMISSION CHARACTERISTICS SUCH AS PACKET PROPAGATION TIME, FLUCTUATIONS IN PROPAGATION TIME AND RESULTS DERIVABLE THEREFROM, IN A TELECOMMUNICATIONS NETWORK

(75) Inventors: Heinrich Doerken, Darmstadt (DE); Joachim Mende, Griesheim (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/381,095

(22) PCT Filed: Jul. 13, 2001

(86) PCT No.: PCT/EP01/08106
§ 371 (c)(1),
(2), (4) Date: Aug. 11, 2003

(87) PCT Pub. No.: WO02/25821
PCT Pub. Date: Mar. 28, 2002

(65) Prior Publication Data
US 2004/0024550 A1 Feb. 5, 2004

(30) Foreign Application Priority Data

Sep. 19, 2000 (DE) ................................. 100 46 240

(51) Int. Cl.
*G06F 1/14* (2006.01)
(52) U.S. Cl. .................. 702/122; 702/125; 370/241
(58) Field of Classification Search .................. 702/79, 702/108, 124, 176–178, 182, 122, 125; 342/356, 342/357.06, 359.06; 370/241
See application file for complete search history.

(56) References Cited

U.S. PATENT DOCUMENTS

| 4,689,626 A | * | 8/1987 | Hori et al. ................. 342/357.12 |
| 5,276,677 A | * | 1/1994 | Ramamurthy et al. ....... 370/232 |
| 5,280,629 A | * | 1/1994 | Lo Galbo et al. ............. 455/503 |
| 5,477,531 A | * | 12/1995 | McKee et al. ................. 370/249 |
| 5,697,051 A | * | 12/1997 | Fawcett ....................... 455/13.2 |
| 5,765,098 A | * | 6/1998 | Bella .......................... 455/13.3 |

(Continued)

FOREIGN PATENT DOCUMENTS

| EP | 0 716 525 | | 6/1996 |
| GB | 2300789 | | 11/1996 |
| GB | 2300789 A | * | 11/1996 |

OTHER PUBLICATIONS

Sierra Wireless, "GPS User Guide", 210202, Rev 1.2, Mar. 2000.*

(Continued)

*Primary Examiner* — Jeffrey R West
(74) *Attorney, Agent, or Firm* — Kenyon & Kenyon LLP

(57) ABSTRACT

A method for measuring unidirectional transmission properties, e.g., packet delay, delay-time fluctuations, and results derivable therefrom, in a telecommunications network. Test packets are transmitted from a first measuring computer via a measurement path to a second measuring computer. The first measuring computer records the departure time of the outgoing test packet. This clock time is transmitted along with the test packet. The second measuring computer records the arrival time of the test packet. In a subtraction operation between the departure time from the first measuring computer and the arrival time in the second measuring computer, the delay time of the test packet, i.e., the measuring result, is determined. To determine the measuring result, the two measuring computers are synchronized in time by satellite systems, e.g., GPS (global positioning system), in that the clock time is continuously transmitted to both measuring computers.

20 Claims, 1 Drawing Sheet

U.S. PATENT DOCUMENTS

| | | | | |
|---|---|---|---|---|
| 5,859,595 | A * | 1/1999 | Yost | 340/7.38 |
| 5,875,181 | A * | 2/1999 | Hsu et al. | 370/320 |
| 5,923,902 | A | 7/1999 | Inagaki | |
| 5,963,943 | A | 10/1999 | Cummins et al. | |
| 6,078,576 | A * | 6/2000 | Schilling et al. | 370/347 |
| 6,091,359 | A * | 7/2000 | Geier | 342/357.31 |
| 6,104,729 | A * | 8/2000 | Hellum et al. | 370/503 |
| 6,222,483 | B1 * | 4/2001 | Twitchell et al. | 342/357.09 |
| 6,226,282 | B1 * | 5/2001 | Chung | 370/335 |
| 6,236,363 | B1 * | 5/2001 | Robbins et al. | 342/360 |
| 6,259,677 | B1 * | 7/2001 | Jain | 370/252 |
| 6,353,856 | B1 * | 3/2002 | Kanemaki | 709/229 |
| 6,469,986 | B1 * | 10/2002 | Lecheler et al. | 370/252 |
| 6,483,856 | B1 * | 11/2002 | Bird | 370/503 |
| 6,646,996 | B1 * | 11/2003 | Barillaud | 370/254 |
| 6,985,499 | B2 * | 1/2006 | Elliot | 370/503 |
| 6,987,746 | B1 * | 1/2006 | Song | 370/335 |
| 6,987,823 | B1 * | 1/2006 | Stark et al. | 375/354 |
| 2002/0021717 | A1 * | 2/2002 | Hedayat et al. | 370/508 |

OTHER PUBLICATIONS

PCT International Search Report for PCT/EP2001/08106 mailed on Oct. 23, 2001.

Graham et al., "Comparative measurement of QoS on the trans-Pacific Internet", Proc. Of the SPIE, Nov. 1998, pp. 289-294.

Fasbender et al., "On assessing unidirectional latencies in packet-switched networks", Communications, 1997. ICC, Montreal. pp. 490-494. Jun. 1997.

Clark et al., "Appication-level measurements of performance on the vBHS", Multimedia Computing and Systems, 1999. IEEE International Conference, Florence, Italy, Jun. 1999, pp. 362-366.

Yuming et al., "Providing Quality of Service: Challenges and Approaches", Conference Proceedings Article, XP010376678. In proc. of IEEE NOMS. 2000.

Shibata et al., "The end-to-end performance of multimedia information services: data analysis and simulation", System Sciences, 1989, vol. II: Software Annual Hawaii International Conference, Kailua-Kona, HI, Jan. 1989, pp. 838-847.

Dempsey et al, "On retransmission-based error control for continuous media traffic in packet-switching networks", Computer Networks and ISDN Systems, North Holland Publishing, Amsterdam, NL. 28(5):719-736, 1996. Mar. 1996.

Kawano et al., "Integrated utilization of heterogeneous database systems through a data network", Digital Communications, Mapping New Applications Onto New Technologies, International Zurich Seminar, 1988. pp. 253-259. Mar. 1988.

* cited by examiner

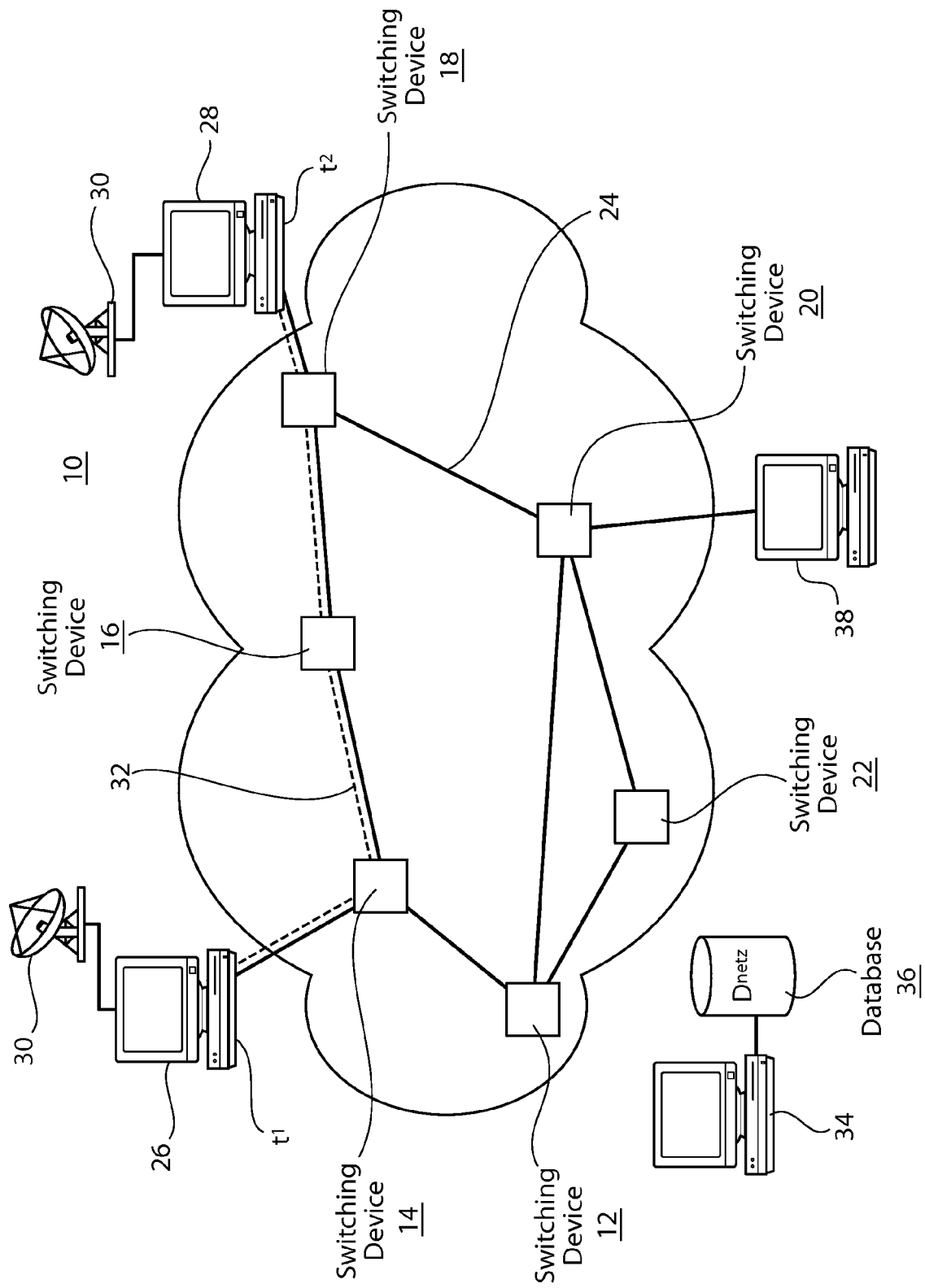

METHOD FOR MEASURING UNIDIRECTIONAL TRANSMISSION CHARACTERISTICS SUCH AS PACKET PROPAGATION TIME, FLUCTUATIONS IN PROPAGATION TIME AND RESULTS DERIVABLE THEREFROM, IN A TELECOMMUNICATIONS NETWORK

FIELD OF THE INVENTION

The present invention is directed to a method for measuring unidirectional transmission properties, such as packet delay, delay-time fluctuations, and results derivable therefrom, in a telecommunications network. The present invention is also directed to a device for implementing the method.

BACKGROUND INFORMATION

Methods for taking measurements of unidirectional transmission properties, such as packet delay, delay-time fluctuations, or the like, in a telecommunications network, such as the Internet, an intranet, or the like, between at least two measuring computers is available. In such cases, a test packet is transmitted from a first measuring computer to a second measuring computer, the first measuring computer recording the departure time of the outgoing test packet, and transmitting this clock time along with the test packet, and the second measuring computer recording the arrival time of the test packet, and a subtraction operation yielding the difference between the departure time from the first measuring computer and the arrival time in the second measuring computer, to determine the delay time of the test packet, the measuring result. The second measuring computer recognizes the departure time from the first measuring computer, from the test packet which contains the information as a timing mark.

The timing marks can be obtained using various methods: before sending the test packet, the measuring computers determine the clock time from a third computer, via the telecommunications network. The third computer presets the reference time for the two measuring computers.

However, in such cases, time fluctuations arise due to the difference in the transmission times when the clock time is communicated to the measuring computers. This makes the measuring results inaccurate so that they cannot be used when considering the quality of the unidirectional transmission properties in a telecommunications network.

Further, the round-trip measurements in the telecommunications network, i.e., when the packet delay is measured from the first measuring computer via the second measuring computer and back, are also much too imprecise, since a symmetrical connection between the two measuring computers cannot be assumed. For example, the connection from the first measuring computer to the second measuring computer can take a first path, and the connection from the second measuring computer to the first measuring computer, a second path, which is not equal to the first path. In this respect, information regarding the packet delays in the context of these measuring methods also may be unusable when considering the unidirectional transmission properties, e.g., if one were to divide the packet delay of the round-trip measurement by two in order to obtain a unidirectional delay.

However, a more or less guaranteed transmission rate is required when implementing new services in the telecommunications network, e.g., in the Internet, when, for example, sending print jobs to print shops. An upper limit is also required for packet delay and delay-time fluctuation, e.g., for IP telephony and video conferencing.

In this context, the decisive quality feature is the unidirectional packet delay, the delay fluctuations derivable therefrom, the packet losses, the throughput, and the availability.

From this, one then guarantees to the customer, for one or more of these parameters, maximum values for packet delays, delay fluctuations, and losses, and/or minimum values for the throughput. In addition, it must be verifiable that these values are being observed by the service provider and the customer.

In this context, the unidirectional packet delay corresponds to the difference between point in time $t_1$ when the first bit of a test packet was sent by a first measuring computer, and point in time $t_2$, when the last bit of the test packet was received by the second measuring computer. The packet delay $D_{network}$ in a telecommunications network thus yields $D_{network}=t_2-t_1$.

Unidirectional delay-time fluctuations are understood to be the differences between the various delay times of the test packets from a first measuring computer—source—to the second measuring computer—drain. The delay-time fluctuation is always considered for only one transmission direction.

In defining, the following distinction is also made:

A pair of test packets is transmitted from one defined source, or a first measuring point, to a defined drain, or a second measuring point. The delay-time fluctuation is then the difference between the measured delay time of the second test packet and the measured delay time of the first test packet of the transmitted pair of test packets.

A stream of test packets is transmitted from one defined source, or a first measuring point, to a defined drain, or a second measuring point. A packet stream is formed, in this context, by logically successive test packets,—numbered packets—, which are transmitted in a fixed sequence. Here, the delay-time fluctuation is the difference between the measured unidirectional delay time of a test packet and the measured delay time of the predecessor packet. Generally, it holds that: $t_{jitter}=D_n-D_{n-1}$. $D_n$ is the unidirectional delay time of test packet n, and $D_{n-1}$ is the delay time of packet n−1. $t_{jitter}$ is then the delay-time fluctuation. The occurrence of the delay-time fluctuation is a direct consequence of different delay times of the test packets.

A packet loss is understood to be when the first bit of an individual test packet, which is sent from a defined source to a defined drain, does not reach the drain. One also speaks of a packet loss when a test packet arrives at the receiver, but has at least one corrupted bit, or when the delay time of a test packet exceeds a predefined time period, such as 255 seconds.

In this context, only one transmission direction is considered. The measuring data are recorded in that a received test packet counts as "1", a packet loss as "0". The packet loss is measured over a defined time interval. At the receiver, the delay resulting from the transit time is to be considered in selecting the measuring interval.

SUMMARY OF THE INVENTION

Embodiments of the present invention provide a method and device for measuring unidirectional transmission properties, such as packet delay, delay-time fluctuations, and results derivable therefrom, in a telecommunications network, in a way that will render possible more precise measurements.

Embodiments of the present invention provide that the property of tuning the clock times in the two measuring computers contributes to the quality of the measuring result.

Embodiments of the present invention provide, for the determination of the measuring result, for the two measuring computers to be synchronized in time by satellite systems, for example, by a GPS (global positioning system), in that the clock time is continuously transmitted by a plurality of satellites to both measuring computers. This assures that both measuring computers have the same clock times, and that the time ascertained, using subtraction, between departure of the test packet and arrival of the test packet, corresponds to the actual packet delay time. Thus, the satellite system acts as a timer for the measuring computers. These timing marks may be generated with an error of ±½ microseconds.

Embodiments of the present invention provide that the measuring result, i.e., the difference between the first timing mark—clock time when the test packet exits the first measuring computer—and the second timing mark—clock time when the test packet arrives at the second measuring computer—is stored in a database. Every authorized user may then query the measuring results from the database via the telecommunications network. In this way, it may be assured that the customers, as well as the telecommunications carriers, are able at any time to query the quality of the unidirectional data transmission from the first measuring computer to the second measuring computer and, if indicated, for example, in response to any exceeding of preset limiting values, take appropriate quality assurance measures.

In embodiments of the present invention, to ensure that only authorized users are able to query the measuring results, an identifier for the authorized user is stored in the database. Once the identifier is communicated by the authorized user, querying of the measuring results from the database is enabled. This may allow one to simply define predetermined persons who are permitted to query the measuring results.

In embodiments of the present invention, the measuring results may be transmitted from the second measuring computer via the telecommunications network to the database. In this way, the measuring results are not stored in the measuring computer whose measuring performance could be adversely affected as a result.

In embodiments of the present invention, to ascertain delay-time fluctuations, at least two test packets may be sent consecutively from the first measuring computer to the second measuring computer. The difference in the delay times of the two test packets yields the delay-time fluctuation.

In embodiments of the present invention, to obtain a complete picture of the quality of the unidirectional measuring connection from the first measuring computer to the second measuring computer, test packets are continuously transmitted from the first measuring computer to the second measuring computer. In embodiments of the present invention, to ensure that no measurement corruptions occur because of transient responses of the hardware and software, the time interval from departure of the test packets from the first measuring computer varies.

In embodiments of the present invention, the information on at which points in time which measuring results occur, is usable for maintaining the quality standard. For that reason, date and clock time information may be assigned to the measuring results and stored accordingly in the database. In this manner, the quality characteristic may be checked as a function of time, and, on the basis of this information, appropriate measures may be taken to improve quality.

In embodiments of the present invention, and as explained above, the departure of the test packet from the first measuring computer is ascertained as a function of time upon transmission of the first bit of a test packet, and is sent along to the test packet as timing mark $t_1$. The arrival of the test packet at the second measuring computer, thus, when the last bit of the test packet was received, is recorded by the second measuring computer as second timing mark $t_2$. in embodiments of the present invention, experience has shown that instant $t_1$, i.e., the instant when the first bit is sent by the first measuring computer, is precisely not such a defined instant, but rather the instant when the test packet is delivered to the protocol software, such as drivers for the network card and TCP/IP stack; and, that $t_2$ is not the instant when the last bit of the test packet is received by the second measuring computer, but rather the instant when the protocol software delivers the test packet to the measuring program.

In embodiments of the present invention, a measuring error also should be considered. It is caused by random events in the operating system, such as process switching times, by the simultaneous arrival of test packets, etc. Thus, to calculate the actual delay of a test packet, it follows that: $D_{network} = t_1 - t_2 - D_{soft} - \bullet$ where the remaining measuring error $\bullet$ is within the range $(0 \bullet \bullet \bullet \bullet_{max})$.

$D_{soft}$ represents the component which is constituted of the time periods needed by the protocol software and the operating system on the transmitting and receiving side of the two measuring computers for processing the test packets. This constant component is dependent upon the hardware and software used. It should be determined for every measuring unit and communicated to the measuring program. For that reason, for every measuring computer, the computer-specific time component required by the software and the operating system of this measuring computer to handle the test packet in the measuring computer until the departure or arrival time is ascertained, is determined. The computer-specific time component is subtracted from the ascertained delay time, and the result corresponds to the true delay time, the true delay time then forming the measuring result. The remaining measuring error $\bullet$ is within the range of 0 to $\bullet_{max}$.

In embodiments of the present invention, to generate the timing marks, thus the clock time of the arrivals and departures of the test packets, GPS cards are installed in the measuring computers. A measuring program is implemented in the measuring computers. However, to prevent any degradation of the measuring accuracy of the measuring computers, the measuring program on the measuring computers does not have its own operator interface. The measurement data are not stored locally on the measuring computers, since hard-drive accesses also influence the processor load and, thus, the measuring accuracy. The measuring program behaves passively, i.e., the measuring connections are established, the measurement data are transferred, and the status of the measuring computers is provided only in response to a request by a separately provided control computer.

In embodiments of the present invention, a control computer is provided, which, via the telecommunications network, controls the measuring computers for determining the measuring result, such as establishing the measuring connections, initiating the transfer of the measuring result to the database, determining the status of the measuring computers, and the like.

In embodiments of the present invention, to ensure that measuring results are not corrupted, no test packets are recorded during the transmission of data from one measuring computer to the control computer.

In embodiments of the present invention, to check other quality features, besides the delay time and the delay-time fluctuations, losses occurring during transmission of the test packets by the measuring computers are also ascertained and are stored accordingly as measuring results in the database.

BRIEF DESCRIPTION OF THE DRAWINGS

FIG. 1 schematically shows a telecommunications network having two measuring computers for implementing the method according to the present invention.

DETAILED DESCRIPTION

FIG. 1 schematically depicts a telecommunications network 10, having a plurality of switching devices 12, 14, 16, 18, 20, and 22, which are interconnected via transmission lines 24.

Switching device 14 is assigned to a first measuring computer 26, and switching device 18 to a second measuring computer 28.

In each measuring computer 26, 28, a measuring program is installed for measuring unidirectional transmission properties.

Each measuring computer 26, 28 is connected to a GPS antenna (global positioning system) and provided with a GPS card for processing the data received via the GPS antenna. Together, the GPS antenna and the GPS card form GPS unit 30.

Connection 24 between first measuring computer 26, switching device 14, switching device 16, switching device 18, and second measuring computer 28, forms measurement path 32, which is shown with a broken line.

A control computer 34 is assigned to switching device 12. Control computer 34 cooperates with a database 36.

Another computer 38, described in the following as a work station, is assigned to switching device 20 via transmission line 24.

Telecommunications network 10 is, for example, the Internet.

The measuring system determines the packet delay from first measuring computer 26 via measurement path 32 to second measuring computer 28. It is thus a question of a unidirectional measuring connection, where individual test packets are sent from first measuring computer 26 to second measuring computer 28.

On measurement path 32, test packets having a constant or exponential time distribution are transmitted to second measuring computer 28. In this context, the test packets are sent with the aid of the user datagram protocol (UDP). This is a connectionless Internet transport protocol, which is defined by IP. The test packets contain, inter alia, timing marks and sequential numbers.

To be able to measure the unidirectional delay time with sufficient accuracy, the timing marks are generated by GPS unit 30. Consequently, the timing marks may be generated with an error of ±½ microseconds. In this connection, the timing mark is set by first measuring computer 26 at the time of transmission of the first bit of a test packet. This corresponds to point in time $t_1$.

In order for GPS units 30 to be able to ascertain the exact time, each GPS unit 30 must receive signals from a plurality of satellites (a maximum of six). If the number of receivable satellites drops for an extended period of time to one, for example due to unfavorable meteorological conditions, then the internal clock is not synchronized. In this case, first measuring computer 26 interrupts the transmission of the test packets and generates an error/status message to this effect to control computer 34.

This measuring system must also be calibrated. In this case, calibration means determining the constant component $D_{soft}$. For this, each measuring computer 26, 28, following the start of its measuring program, sends test packets to its own IP address. These test packets propagate through the TCP/IP stack twice. The ascertained minimal delay time corresponds to twice the transmission delay through the TCP/IP stack. The value divided by two is the calibration value for this measuring computer 26, 28. Thus, for a connection between first measuring computer 26 and second measuring computer 28, it follows for $D_{soft}$ that:

$$D_{soft} = CV_{src} + CV_{dest}.$$

CV being the calibration value, and src standing for the source and, thus, for first measuring computer 26, and dest for the drain and, thus, for second measuring computer 28.

At this point, the test packet is transmitted via measurement path 32, thus via transmission line 24, switching exchange 14, switching exchange 16, and switching exchange 18, to second measuring computer 28. When the last bit of the test packet is received at the second measuring computer, the second timing mark is recorded. This corresponds to point in time $t_2$. Second timing mark $t_2$ is generated by second measuring computer 28, likewise using a GPS unit 30.

From $t_1$ and $t_2$, at this point taking into consideration a computer-specific time component $D_{soft}$, packet delay time $D_{network}$ is calculated in accordance with the formula $D_{network} = t_1 - t_2 - D_{soft}$-*, and this value is transmitted as a measuring result to control computer 34, and is stored in database 36. The results are able to be continuously displayed online via the monitor of control computer 34.

To be able to ascertain unidirectional delay-time fluctuations, test packets are continuously transmitted from first measuring computer 26 to second measuring computer 28 in the manner just described. In this context, the delay-time fluctuation is the difference between the measured unidirectional delay time of a test packet and the measured delay time of the preceding packet, so that the following formula is derived: $t_{jitter} = D_n - D_{n-1}$, $D_n$ being the unidirectional delay time of test packet n, $D_{n-1}$ being the delay time of packet n-1, and $t_{jitter}$ being the delay-time fluctuation.

In addition, packet losses may also be ascertained and represented via measuring computers 26, 28 and via control computer 34.

Every authorized user may query the quality of the connection from first measuring computer 26 to second measuring computer 28, for example, from his/her work station 38. To do so, he/she logs onto database 36 via the Internet, transmits his/her identifier, and, if the identifier matches, he/she may query the data, such as packet delay time, delay-time fluctuation, packet losses or the like. In this context, the measuring result in the database includes the creation date, the name of the first measuring computer, the IP address of the first measuring computer, the name of the second measuring computer, the IP address of the second measuring computer, as well as the port number. The measurement data files have the following format:

Status—time stamp—packet delay—sequential number—packet length—TOS.

The status indicates whether the time stamp and the value for the packet delay are valid. If the status value is unequal to 0, then only the values including the sequential number required for the loss calculation, the packet length, and TOS are valid. The time stamp indicates the point in time when the test packet was sent by second measuring computer 28 to control computer 34.

For example, for every measuring connection having an average packet interval of one second, at a data length of approx. 50 bytes, a data volume of about 4.3 megabytes per day has to be expected.

By synchronizing the clocks of the two measuring computers 26, 28, precise enough measurements may now be taken in a simple fashion to record the packet delay, delay-time fluctuations, and the like.

What is claimed is:

1. A method for measuring unidirectional transmission properties and results derivable therefrom in a telecommunications network, comprising:
   providing a first measuring computer and a second measuring computer;
   synchronizing in time the first measuring computer and the second measuring computer by a plurality of satellites so that a clock time is continuously transmitted by the plurality of satellites to the first and second measuring computers;
   transmitting at least one test packet from the first measuring computer to the second measuring computer;
   recording a departure time of the at least one test packet by the first measuring computer;
   transmitting the departure time along with the at least one test packet;
   recording an arrival time of the at least one test packet by the second measuring computer;
   subtracting the departure time from the arrival time to determine a measuring result;
   storing the measuring result in a database;
   determining an actual delay of the at least one test packet, wherein the actual delay of the at least one test packet is equal to subtracting a computer-specific time component constant and a measuring error from the measuring result;
   interrupting transmission of the at least one test packet if the plurality of satellites includes only one working satellite for a predetermined period of time;
   generating a status message indicating the transmission interruption of the at least one test packet; and
   resuming transmission of the at least one test packet when the plurality of satellites includes more than one working satellite.

2. The method as recited in claim 1, further comprising: allowing the measuring result to be queried from the database via the telecommunications network.

3. The method as recited in claim 2, further comprising: releasing the measuring result queried upon transmission of a first identifier, wherein the first identifier corresponds to a second identifier stored in the database indicating authorized access.

4. The method as recited in claim 1, further comprising: transmitting the measuring result from the second measuring computer via the telecommunications network to the database.

5. The method as recited in claim 1, further comprising: sending consecutively at least two test packets from the first measuring computer to the second measuring computer so as to ascertain delay-time fluctuations.

6. The method as recited in claim 1, wherein a plurality of test packets are continuously transmitted from the first measuring computer to the second measuring computer, each test packet of the plurality of test packets being transmitted at a different respective departure time.

7. The method as recited in claim 1, further comprising: storing data and clock information assigned to the measuring result in the database so as to have capability to discern when the measuring result occurred.

8. The method as recited in claim 1, wherein the computer-specific time component constant is determined as required by software and an operating system of a respective measuring computer to handle the at least one test packet in the respective measuring computer until one of the departure time and the arrival time is ascertained for each measuring computer of the first and second measuring computers.

9. The method as recited in claim 1, further comprising: controlling the first and second measuring computers by a control computer via the telecommunications network.

10. The method as recited in claim 9, wherein no test packet is recorded during transmission of data from at least one of the first measuring computer and the second measuring computer to the control computer.

11. The method as recited in claim 9, wherein the controlling of the first and second measuring computer includes at least one of establishing measuring connections, initiating transfer of the measuring result to the database, determining status of the first measuring computer, and determining status of the second measuring computer.

12. The method as recited in claim 1, wherein the plurality of satellites includes a Global Positioning System.

13. The method as recited in claim 1, wherein the unidirectional transmission properties measured include at least one of actual delay, packet delay and delay-time fluctuations, and wherein the telecommunications network is at least one of Internet and intranet.

14. The method of claim 1, wherein the computer-specific time component constant corresponds to time needed by a software of at least one of the first and second measuring computers to handle the at least one test packet until a respective at least one of a departure time and an arrival time is ascertained; and wherein the measuring error corresponds to an error caused by a random event.

15. A method for measuring unidirectional transmission properties and results derivable therefrom in a telecommunications network, comprising:
   providing a first measuring computer and a second measuring computer;
   synchronizing in time the first measuring computer and the second measuring computer by a plurality of satellites so that a clock time is continuously transmitted by the plurality of satellites to the first and second measuring computers;
   transmitting at least one test packet from the first measuring computer to the second measuring computer;
   recording a departure time of the at least one test packet by the first measuring computer;
   transmitting the departure time along with the at least one test packet;
   recording an arrival time of the at least one test packet by the second measuring computer;
   subtracting the departure time from the arrival time to determine a measuring result;
   storing the measuring result in a database;
   subtracting a computer-specific time component from the measuring result to obtain a true delay time;
   storing the true delay time as a new measuring result in the database;
   interrupting transmission of the at least one test packet if the plurality of satellites includes only one working satellite for a predetermined period of time;
   generating a status message indicating the transmission interruption of the at least one test packet; and
   resuming transmission of the at least one test packet when the plurality of satellites includes more than one working satellite.

16. The method as recited in claim 15, further comprising: allowing the new measuring result to be queried from the database via the telecommunications network.

17. The method as recited in claim 15, further comprising:
releasing the new measuring result queried upon transmission of a first identifier, wherein the first identifier corresponds to a second identifier stored in the database indicating authorized access.

18. The method as recited in claim 15, further comprising:
transmitting the new measuring result from the second measuring computer via the telecommunications network to the database.

19. The method of claim 15, wherein the computer-specific time component constant corresponds to time needed by a software of at least one of the first and second measuring computers to handle the at least one test packet until a respective at least one of a departure time and an arrival time is ascertained.

20. The method as recited in claim 15, wherein a plurality of test packets are continuously transmitted from the first measuring computer to the second measuring computer, each test packet of the plurality of test packets being transmitted at a different respective departure time.

* * * * *